(12) United States Patent
Roback (10) Patent No.: US 11,173,423 B2
(45) Date of Patent: Nov. 16, 2021

(54) SPRING FILTER SYSTEM

(71) Applicant: Ian L. Roback, Northfield, MN (US)

(72) Inventor: Ian L. Roback, Northfield, MN (US)

( * ) Notice: Subject to any disclaimer, the term of this patent is extended or adjusted under 35 U.S.C. 154(b) by 0 days.

(21) Appl. No.: 16/933,374

(22) Filed: Jul. 20, 2020

(65) Prior Publication Data

US 2021/0268407 A1   Sep. 2, 2021

Related U.S. Application Data (60) Provisional application No. 62/982,908, filed on Feb. 28, 2020.

(51) Int. Cl.
| | | |
|---|---|---|
| *B01D 21/02* | (2006.01) | |
| *B01D 21/00* | (2006.01) | |
| *B01D 21/24* | (2006.01) | |

(52) U.S. Cl.
CPC ..... *B01D 21/0054* (2013.01); *B01D 21/0006* (2013.01); *B01D 21/0024* (2013.01); *B01D 21/0033* (2013.01); *B01D 21/2483* (2013.01); *B01D 2201/086* (2013.01); *B01D 2201/16* (2013.01)

(58) Field of Classification Search
CPC ............ B01D 21/0006; B01D 21/0024; B01D 21/0033; B01D 21/0042; B01D 21/0054; B01D 21/245; B01D 21/2483
USPC .......................... 210/521, 523, 527, 536, 803
See application file for complete search history.

(56) References Cited

U.S. PATENT DOCUMENTS

| | | | | |
|---|---|---|---|---|
| 3,425,913 A | * | 2/1969 | Holden | B01D 17/0211 210/521 |
| 4,157,969 A | * | 6/1979 | Thies | B01D 17/0211 210/521 |
| 5,073,261 A | * | 12/1991 | Conradi | E02B 15/045 210/521 |
| 6,607,666 B2 | * | 8/2003 | Rajewski | B01D 21/245 210/527 |
| 7,429,319 B2 | * | 9/2008 | Davis | E03F 7/10 210/527 |
| 7,740,757 B2 | * | 6/2010 | Yang | B01D 21/0045 210/521 |
| 2002/0121476 A1 | * | 9/2002 | Wang | B01D 21/18 210/527 |

(Continued)

FOREIGN PATENT DOCUMENTS

FR      2704769    * 11/1994

*Primary Examiner* — Christopher Upton
(74) *Attorney, Agent, or Firm* — Andrus Intellectual Property Law, LLP (57) ABSTRACT

A side-flushing mechanical filter system includes a spring positioned within a pipe and a plurality of plates attached to the spring, each plate defining at least one hole, and a rod positioned partially within the pipe, a proximal end of the rod attached to a distal-most plate and a distal portion of rod extending from the distal end of the pipe. A major face of each plate is configured to arrest sediment from water flowing into the pipe via a first water inlet while the holes defined by the plates enable filtered water to flow therethrough and out of the first water outlet when the first water inlet and first water outlet are opened. During cleaning of sediment, graywater flows into the pipe via the second water inlet and over the plates while a user moves the rod to dislodge sediment from the plates and toward an outlet.

14 Claims, 7 Drawing Sheets

(56) References Cited

U.S. PATENT DOCUMENTS

2007/0045202 A1\* 3/2007 Peloquin ............ B01D 21/2461
210/803

\* cited by examiner

SPRING FILTER SYSTEM

CROSS-REFERENCE TO RELATED APPLICATIONS

This application claims the benefit of U.S. Provisional Application No. 62/982,908, filed Feb. 28, 2020 and entitled SPRING FILTER SYSTEM, the entirety of which is hereby incorporated by reference.

STATEMENT REGARDING FEDERALLY SPONSORED RESEARCH OR DEVELOPMENT

Not Applicable

BACKGROUND OF THE INVENTION

Field of the Invention

The invention relates to a side-flushing mechanical filter system for filtering sediment from fluids.

Description of the Related Art

Water treatment systems for filtering sediment from surface water are needed and used worldwide. In all such filter systems, a filter component that traps sediment is needed as well as one or more components that enable the removal of accumulated sediment from the system. Such filter systems generally comprise one of several known configurations. One such configuration is the backflushing (or backwash) filter system, in which water is pumped backwards through the system to dislodge sediment from the filter. Sediment dislodged from the filter in a backflushing filter system then exits the filter system via a designated channel. However, systems using a carbon filter that needs to be backflushed may not be ideal for applications such as agricultural systems, because once water is cleaned it needs to be used. Other known configurations require the system to be opened and the accumulated sediment to be vacuumed from the system, or for the filter (e.g., a mesh) to be removed for cleaning and then replaced in the system. Such known filter systems often require electrical input (e.g., to a pump) to power the system, at least during removal of sediment from the system and in some instances during normal filtration operations. Additionally, or alternatively, such known filter systems may require some degree of disassembly to facilitate sediment removal, and in some such instances may require filter components to be replaced when they become clogged with sediment. The operating requirements of electricity, disassembly for sediment removal, and/or frequent replacement of filter components contribute to the high cost and/or labor intensive nature of such known systems.

Various embodiments of the present invention provide one or more such advantages and address, inter alia, the aforementioned issues with known filter systems.

SUMMARY

The present invention provides a filter system that does not require electricity, disassembly for sediment removal, and/or frequent replacement of filter components, thereby providing a relatively low-cost and low-maintenance filter system that also effectively filters sediment from water and allows accumulated sediment to be easily flushed from the system. Accordingly, in the examples described herein, a side-flushing mechanical filter system for sediment is provided. The side-flushing mechanical filter system of the present disclosure is entirely mechanical and does not require frequent replacement of filter components, while providing effective filtration of sediment. Moreover, the side-flushing mechanical filter system of the present disclosure enables accumulated sediment to be flushed from the system without requiring disassembly of the system. In this manner, the side-flushing mechanical filter system of the present disclosure is relatively low-cost, low-maintenance, and easy to operate. It may be advantageously used in numerous applications, such as developing and/or remote regions where electricity is unavailable and/or where low cost and ease of operation are desirable. While numerous types of sediments may be filtered from water by the side-flushing mechanical filter system described herein, this system notably is capable of effectively filtering nitrates from water.

In one embodiment, a side-flushing mechanical filter system comprises: a main body comprising an elongated section of pipe extending from a proximal end to a distal end; a first water inlet at the proximal end of the pipe; a first water outlet at the distal end of the pipe; a second water inlet positioned at an upper surface of the pipe between the proximal and distal ends of the pipe; a second water outlet positioned at a lower surface of the pipe between the proximal and distal ends of the pipe; a sediment outlet positioned at the lower surface of the pipe between the proximal and distal ends of the pipe, the sediment outlet distal to the second water outlet; an elongated spring positioned within the pipe, the elongated spring comprising a plurality of coils and extending substantially parallel to a longitudinal axis defined by the pipe, wherein a portion of the spring is axially aligned with the second water inlet relative to the longitudinal axis of the pipe; a plurality of plates positioned within the pipe, wherein each plate is attached to a different one of the plurality of coils of the spring such that a major face of each plate is substantially perpendicular to the longitudinal axis of the pipe, each plate of the plurality of plates defining at least one hole therethrough; and a rod positioned partially within the pipe such that a proximal end of the rod is attached to a distal-most plate of the plurality of plates and a distal portion of rod extends externally of the pipe from the distal end of the pipe, wherein the major face of each plate is configured to arrest sediment from water flowing into the pipe via the first water inlet while the holes defined by the plates enable filtered water to flow therethrough and out of the first water outlet when the first water inlet and the first water outlet are opened.

The description of the invention and its applications as set forth herein is illustrative and is not intended to limit the scope of the invention. Features of various embodiments may be combined with other embodiments within the contemplation of this invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

DETAILED DESCRIPTION OF THE INVENTION

Side-flushing mechanical filter systems for removing sediment from water are provided. Such systems may generally be referred to herein as "filter systems." Compared to known filter systems, the filter systems of the present disclosure are lower-cost, easier to clean, requires less maintenance and avoid the need for a user to frequently replace filters. These and other features make the filter systems of the present disclosure well-suited to agricultural systems, wetland-remediation systems, and other applications in which these advantages are desirable and for which known filter systems are not possible or ideal.

The filter systems of the present invention advantageously may be used in wetlands to separate sediment before returning to the water to graywater in the wetland. It is important to note that if used in a hybrid/tiered wetland system (or any system where the water is returned to graywater after filtering), the filter systems of the present invention can be used multiple times on each tier or between wetlands to remove sediment and reduce buildup. The filter systems of the present invention also may be used in a hybrid wetland comprising a subsurface-flow wetland and a free-flow surface wetland, with the filter system being placed between the two wetlands of the hybrid wetland. Such hybrid wetlands would greatly benefit from having a filter system of the present invention between the two wetlands to reduce buildup in the free-flow surface wetland of sediment that can drain from the subsurface-flow wetland. Additionally, or alternatively, the filter systems of the present invention can be used to filter water for use as drinking water or in reclaimed water irrigation systems and other uses.

The filter systems of the present invention essentially comprise a column in a pipe (e.g., PVC pipe) with a plurality of stainless steel plates attached to a spring. The spring extends substantially parallel to the longitudinal axis of the pipe and rests on the inner bottom surface of the pipe. The plates may be attached to coils of the spring in any suitable manner, such as by welding, such that a major face of each plate is substantially perpendicular to the longitudinal axis of the pipe when the spring is positioned in the pipe. The plates are attached to the different coils of the spring such that there is at least one non-plate-bearing coil between each of the plate-bearing coils of the spring to preserve compression and expansion capability of the spring. The plates have holes drilled therein to allow water to pass through, but minimal sediment to pass through. Instead, sediment passing through the pipe is arrested by the plates, whereupon much of the sediment falls to the bottom of the pipe beneath the plates. Some of the sediment may adhere to the plates and may be removed therefrom during sediment flushing as described below. A stainless steel rod is attached to the distal-most plate in any suitable manner (e.g., by welding) such that a proximal portion of the rod is housed within the pipe. The rod extends distally through a PVC cap at the distal end of the pipe, such that a distal section of the rod is external to the pipe, and can be moved longitudinally back-and-forth to move the spring and plates during sediment flushing as described below. The mechanism comprising the plates, spring, and rod operates within the pipe, with the rod exiting the distal end of the system.

It should be understood that although one or more features of the side-flushing mechanical filter systems of the present disclosure are described as being made of a particular material for the sake of example and clarity, any other suitable materials may be used for such components. In addition, one or more features of the filter systems described herein may vary from those illustrated and discussed herein, including but not limited to their dimensions and/or proportions relative to other features while remaining within the scope of this disclosure.

Figure 1:
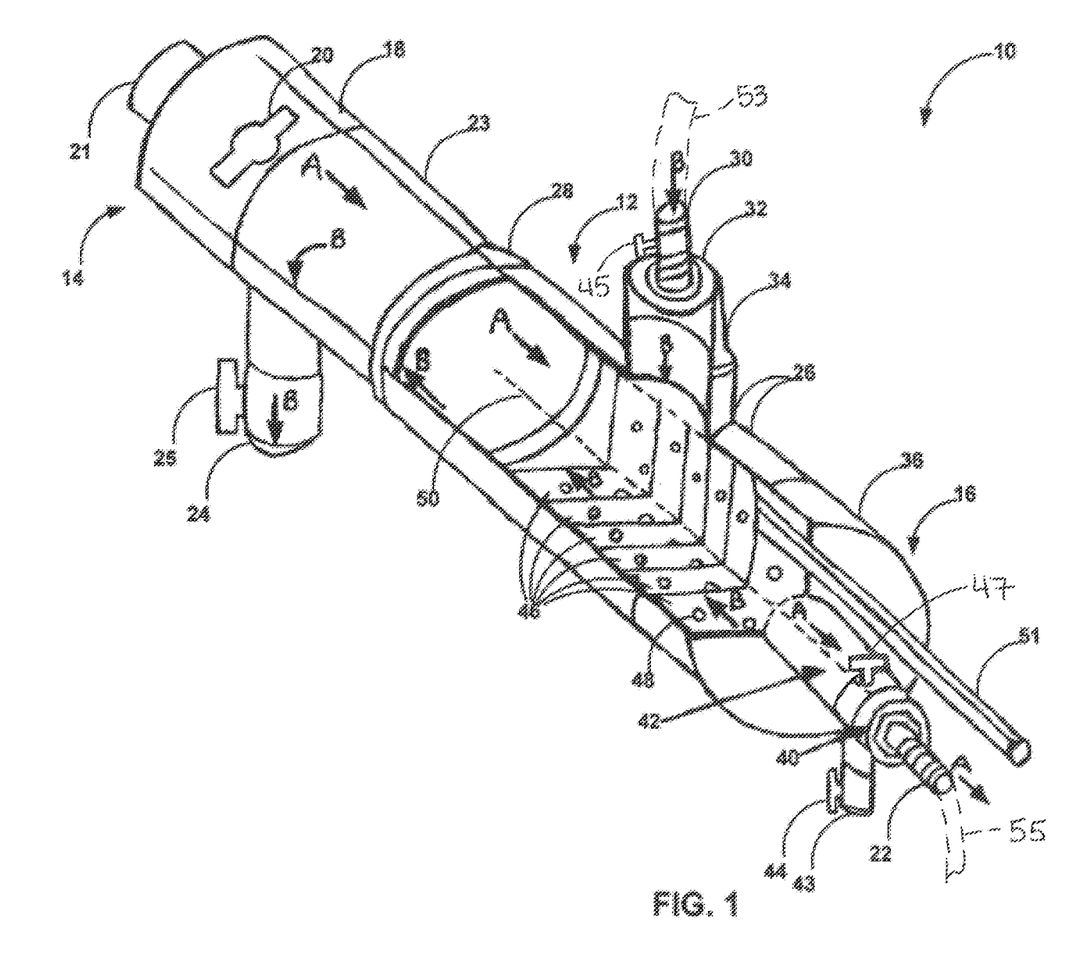
FIG. 1 is a perspective view with partial cutaway of an example side-flushing mechanical filter system in accordance with this disclosure, with paths of water travel during normal operation (A) and during sediment flushing (B) shown.

FIG. 1 is a perspective view with partial cutaway of an example filter system 10 in accordance with this disclosure, with paths of water travel during normal operation (A) and during sediment flushing (B) shown. System 10 includes a main body comprising an elongated section of multi-segmented pipe 12 that extends from a proximal end 14 to a distal end 16. At the proximal end 16 of the pipe 12 is a proximal cap 18 that includes a first valve 20, which may be a 25 cm valve, and a first water inlet 21. A first water outlet 22 is positioned at distal end 16 and discussed in further detail below. In the illustrated embodiment of FIG. 1, proximal cap 18 is a 40 centimeter (cm) PVC cap. Proximal cap 18 is connected to proximal tee socket 23, which may be a 25×25×25 cm PVC tee socket. Proximal tee socket 23 includes second water outlet 24 and a second valve 25, which may be a 25 cm valve. Proximal tee socket 23 is connected to a distal tee socket 26 by proximal 25-to-40 cm PVC connector 28. Distal tee socket 26 may be a 40×40×40 cm tee socket. A second water inlet 30, which may comprise a brass male-to-male connector, is connected to an upper surface of the distal tee socket 26 by a 25 cm female-threaded adaptor 32 and a distal 25-to-40 cm PVC connector 34. Thus, the second water inlet 30 is positioned distally to the second water outlet 24 in the illustrated embodiment of FIG. 1. The distal tee socket 26 is connected to a distal 40 cm PVC cap 36 positioned at distal end 16 of the pipe 12.

Extending from the distal PVC cap 36 is the first water outlet 22, which may comprise a brass male-to-male connector connected to the distal PVC cap 36 by a 15 cm female-threaded adaptor 40 and a 15×15×15 cm PVC tee socket 42. The 15×15×15 cm PVC tee socket 42 comprises a sediment outlet 43 positioned at a lower surface of the 15×15×15 cm PVC tee socket 42 and a third valve 44. In some embodiments, a fourth valve 45 may be positioned at the second water inlet 30 and a fifth valve 47 may be positioned at an upper surface of the 15×15×15 cm PVC tee socket 42 to further control the flow of water through the pipe 12 as discussed below.

Within the distal tee socket 26 and the distal PVC cap 36 is positioned a plurality of plates 46 attached to a spring (shown in FIGS. 2-5). The plates 46 and spring may extend from the proximal end of the proximal tee socket 23 to the distal end of the distal tee socket 26. For the sake of illustration of the inside of the pipe 12, however, FIG. 1 only shows the plates 46 extending through the distal tee socket 26. The plates 46, which may be made of stainless steel or other suitable material, each define a plurality of holes 48 that enable the flow of water therethrough. The plates 46 may define any suitable number of holes 48 in any configuration. Although the holes 48 shown in FIG. 1 are substantially circular in shape, it should be understood that the holes 48 may have any suitable shape to enable the flow of water through the pipe 12. The plates 46, which may be circular in shape, are positioned within the pipe 12 such that the major faces of the plates 46 are substantially perpendicular to a longitudinal axis 50 of the pipe 12 and may have a diameter that is nearly equal to an inner diameter of the pipe 12 but less than the inner diameter of the pipe 12 to a degree necessary for the spring and plates 46 to be longitudinally movable within the pipe 12. In this manner, nearly all of the water flowing through the pipe 12 during filtering operation is forced to flow past the plates 46 via the holes 48, enabling the plates 46 to arrest sediment from the water. A rod 51 is positioned partially within the pipe 12 such that a proximal end of the rod 51 (e.g., a stainless steel rod) is attached to a distal-most plate one of plates 46 and a distal portion of rod 51 extends externally of the pipe 12 from the distal 40 cm PVC cap 36. A rubber water seal may be positioned around the rod 51 where it exits the distal 40 cm PVC cap 36 to prevent water from escaping around the rod 51.

The operation of the filter system 10 will now be described. During normal filtration operation, the first valve 20 is open, the second valve 25 is closed, and the third valve 44 is closed. If the system is equipped with a fourth valve 45 at the second water inlet 30 and/or a fifth valve 47 at the first water outlet 22, the fourth valve 45 is closed and the fifth valve 47 is open during normal filtration. During normal filtration, water to be filtered takes the path of travel "A", entering the filter system 10 at the first water inlet 10, running through the pipe 12 via the holes 48 defined by the plates 46. Sediment passing through the pipe 12 is arrested by the plates 46, whereupon much of the sediment falls to the bottom of the pipe 12 beneath the plates 46. Some of the sediment may adhere to the plates 46 and may be removed therefrom during sediment flushing as described below. Filtered water exits the pipe 12 via the first outlet 22, which as described above may be a brass male-to-male connector. A hose may be connected to the brass male-to-male connector at the distal end of the system to direct the cleaned water as desired. If the filter system 10 is equipped with a fifth valve 47 at upper surface of the 15×15×15 cm PVC tee socket 42, the fifth valve 47 may be used to enable further control of the flow of water through the pipe, such as during the sediment-flushing operation described below.

When it is desired to clean the sediment from the plates 46, graywater may be introduced into the filter system 10 via a hose 53 connected to the brass male-to-male connector of the second water inlet 30. During sediment flushing the first valve 20 is closed, the second valve 25 is open, and the third valve 44 is open. If the system is equipped with a fourth valve 45 at the second water inlet 30 and/or a fifth valve 47 at the first water outlet 22, the fourth valve 45 is open and the fifth valve 47 is closed during sediment flushing. If the system 10 is equipped with a fourth valve 45 at the second water inlet 30, the fourth valve 45 may be used to further control the graywater introduced into the system 10. The path of travel "B" shows where the graywater comes in through the second inlet 30, spraying down onto the plates 46. A user moves the stainless steel rod 51 longitudinally back and forth, causing the plates 46 and the spring to which the plates 46 are attached to move longitudinally through the pipe. The plates 46 oscillate while remaining relatively upright when sprayed with the water entering from the second water inlet 30, but will change angles as they are moved longitudinally while the spring is compressed and released by the stainless steel rod 51. During this cleaning operation, the plates 46 push sediment that has gathered in the pipe 12 to the sediment outlet 43 where the sediment is washed out while the graywater exits the second water outlet 24 at the bottom of the pipe 12. In addition, the graywater that enters from the second water inlet 30 dislodges sediment that may have adhered to the plates 46 during filtering operation, washing the dislodged sediment to the bottom of the pipe 12 where it can be pushed to the sediment outlet 43 during longitudinal movement of the rod 51. The sediment that flows out of the sediment outlet 43 can be captured and used for fertilizer or disposed of.

During cleaning, a hose 55 attached to the male-to-male connector at the first water outlet 22 may be pinched off to prevent water from flowing out of the end of the pipe, or, if so equipped, a fifth valve 47 at the 15×15×15 cm PVC tee socket 42 is turned off to prevent water from flowing out of the first water outlet 22 during cleaning. When the second valve 25 is closed, the graywater source is disconnected, and the first water inlet 21 and the first water outlet 22 are opened, water will flow through the pipe 12 normally and sediment will be filtered out by the plates 46.

Thus, no electricity is required for normal operations or cleaning operations of the filter system 10, and cleaning operations do not require disassembly of the filter system 10 or frequent replacement of parts. Instead, as discussed above, the user need only actuate several valves (and/or pinch off and/or connect one or more hoses) and move the rod 51 back and forth to clean accumulated sediment from the filter system 10.

Figure 2:
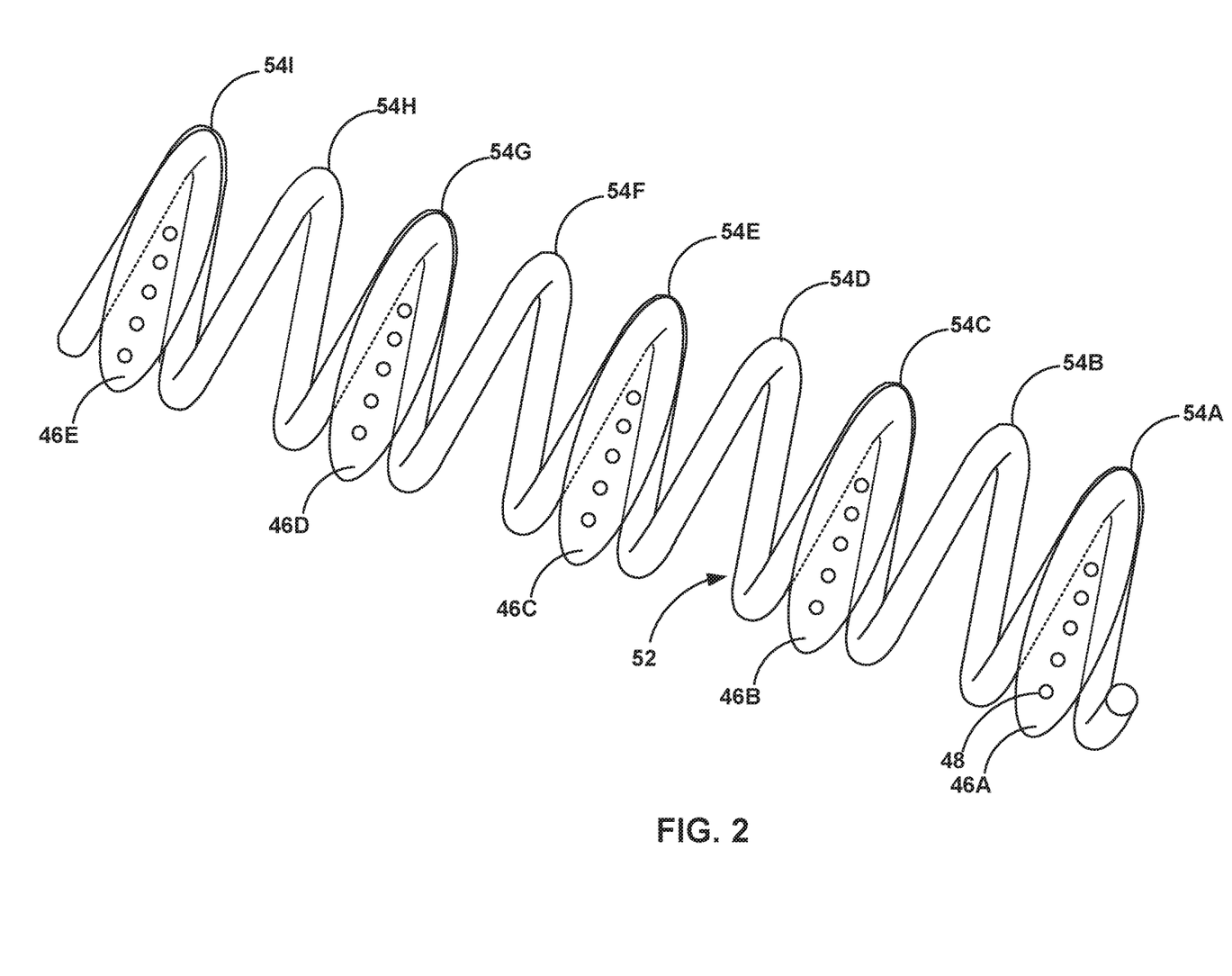
FIG. 2 is a side perspective view of the spring and attached plates of the side-flushing mechanical filter system of FIG. 1.

FIG. 2 is a side perspective view of a spring 52 and attached plates 46A-46E of the side-flushing mechanical filter system 10 of FIG. 1. The spring 52 comprises a plurality of coils 54A-54I. It should be noted that the spring 52 may comprise greater or fewer coils 54 and plates 46 than those shown in FIG. 2 as the numbers of coils and plates shown in FIG. 2 are selected only for the sake of illustration. As shown in FIG. 2, the plates 46A-46E are attached to alternating ones of the coils 54A-54I such that every other one of the coils has a plate attached thereto. Leaving at least one (or more) non-plate bearing coils between plate-bearing coils of the spring 52 prevents the plates 46 from touching and closing off the flow of water. In the embodiment of FIG. 2, major faces of the plates 46A-46E are attached, e.g., by welding, to top edges of the corresponding coils. In this embodiment, the plates 46A-46E and the coils 54A-54I have substantially similar diameters, which may be advantageous in applications where a large amount of sediment buildup is not expected. However, in other embodiments, such as embodiments where more sediment buildup is expected, the coils of the spring may have a diameter substantially smaller than the diameter of the plates, which will help the user maintain control during the sediment flushing process by focusing the force transmitted from the rod on a smaller surface area.

Figure 3:
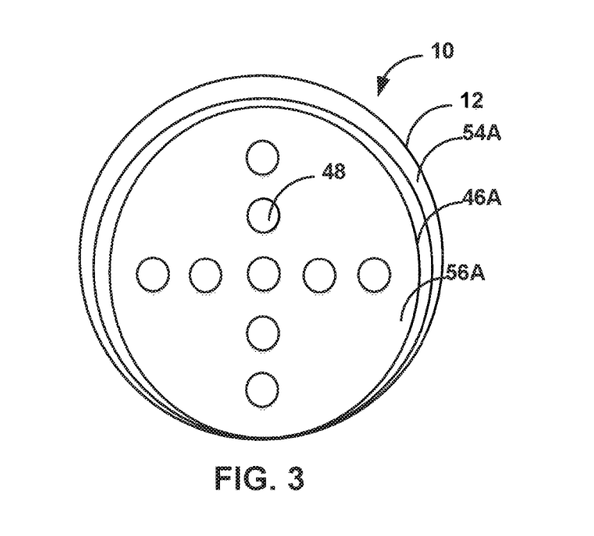
FIG. 3 is a cross-sectional end view of the side-flushing mechanical filter system of FIG. 1, with the cross-section taken perpendicular to the longitudinal axis of the pipe of the filter system at the distal end of the pipe.

FIG. 3 is a cross-sectional end view of the side-flushing mechanical filter system 10 of FIG. 1, with the cross-section taken perpendicular to the longitudinal axis of the pipe 12 of the filter system 10 at the distal end 16 of the pipe 12. As shown in FIG. 3, the distal-most plate 46A, is in the foreground, attached to the coil 54A. The plate 46A is positioned within the pipe 12 such that a major face 56A of the plate 46A is substantially perpendicular to the longitudinal axis of the pipe 12. Together, the spring 52 and the plate 46A occupy nearly the entire inner diameter of the pipe 12 so that nearly all of the water flowing through the pipe 12 and past the plate 46A during normal filtration will pass through the holes 48.

Figure 4:
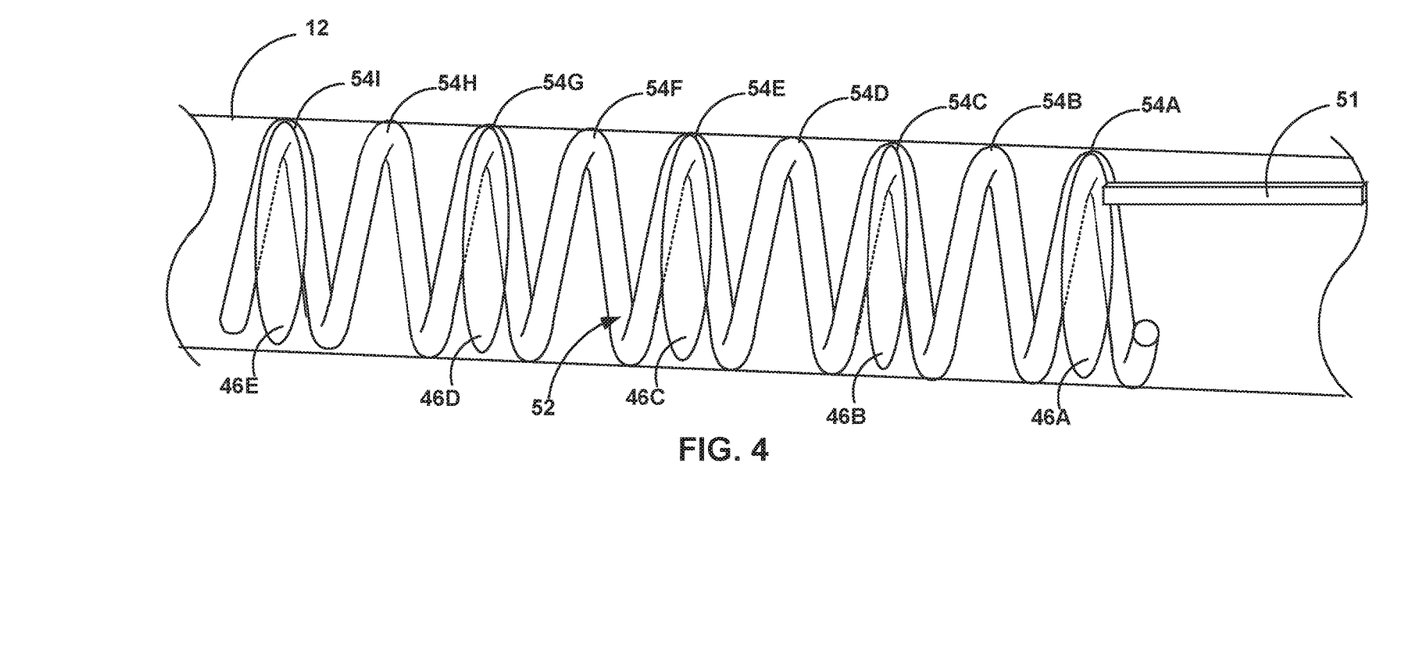
FIG. 4 is another side perspective view of the spring and attached plates of the side-flushing mechanical filter system of FIG. 1, with the spring and plates positioned within the pipe and the rod attached to the distal-most plate.

FIG. 4 is another side perspective view of the spring 52 and attached plates 46A-46E of the side-flushing mechanical filter system 10 of FIG. 1, with the spring 52 and plates 46A-46E positioned within the pipe 12 and the rod 51 attached to the distal-most plate 46A.

Figure 5:
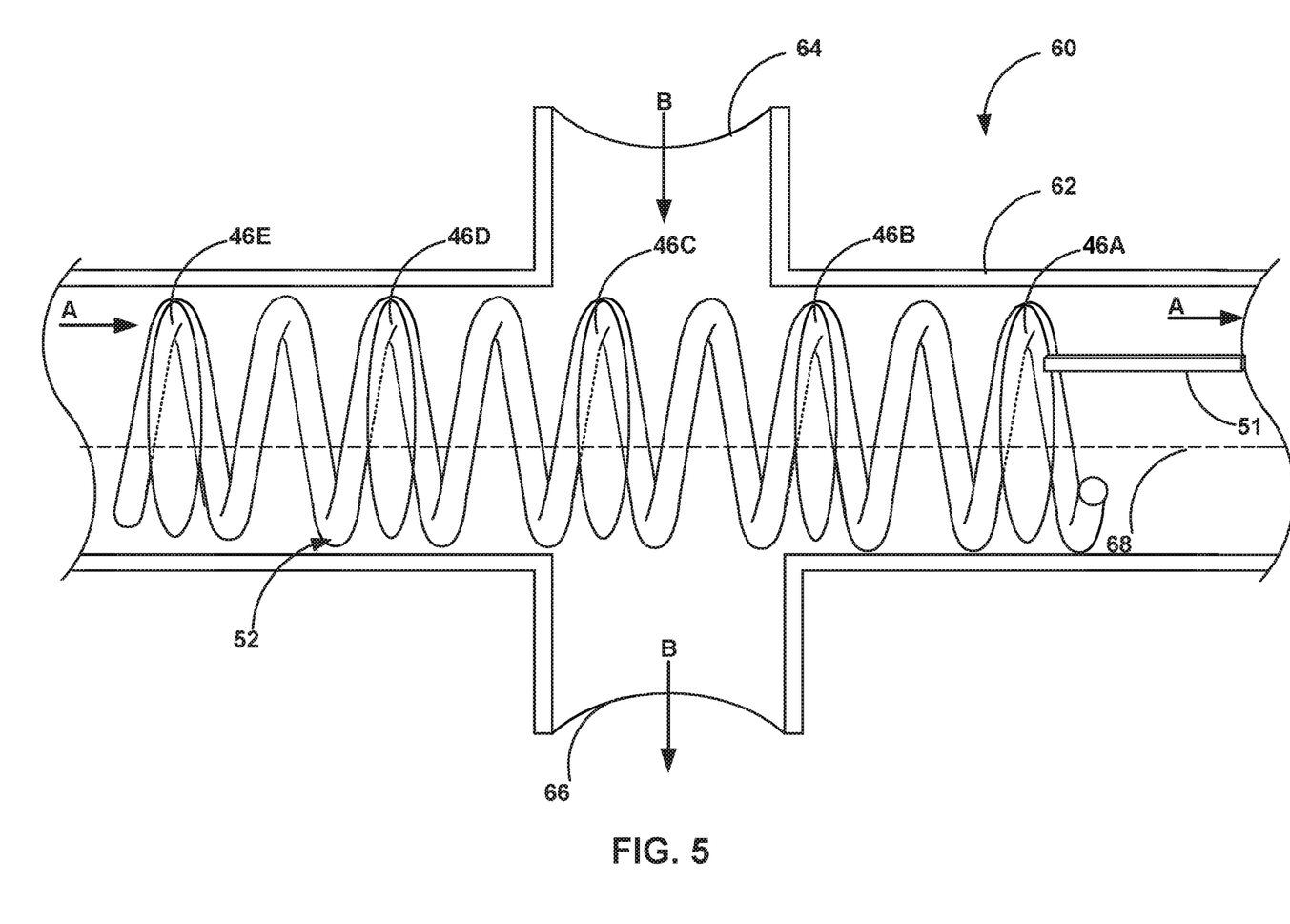
FIG. 5 is a cross-sectional side view of another example side-flushing mechanical filter system having a four-way tee socket section for alignment of inlet and outflow of water during sediment flushing (B).

FIG. 5 is a cross-sectional side view of another example side-flushing mechanical filter system 60 having a four-way tee socket section 62 for alignment of inlet and outflow of water during sediment flushing (B). The components and operation of the system 60 may be substantially similar to the system 10 of FIGS. 1-4, except system 60 includes the four-way tee socket section 62 instead of the three-way distal tee socket 26 and may include a straight segment (not shown) between the four-way tee socket 62 and a proximal PVC cap instead of the proximal tee socket 23. In this embodiment, second water inflow 64 of the replaces the second water inflow 30 of system 10 and second water outlet 66 replaces the second water outlet 24 of system 10. As shown, the second water inlet 64 and the second water outlet 66 are axially aligned along a longitudinal axis 68 of the four-way tee socket 62. The spring 52 and plates 46 extend through the four-way tee socket 62 as shown.

Figure 6:
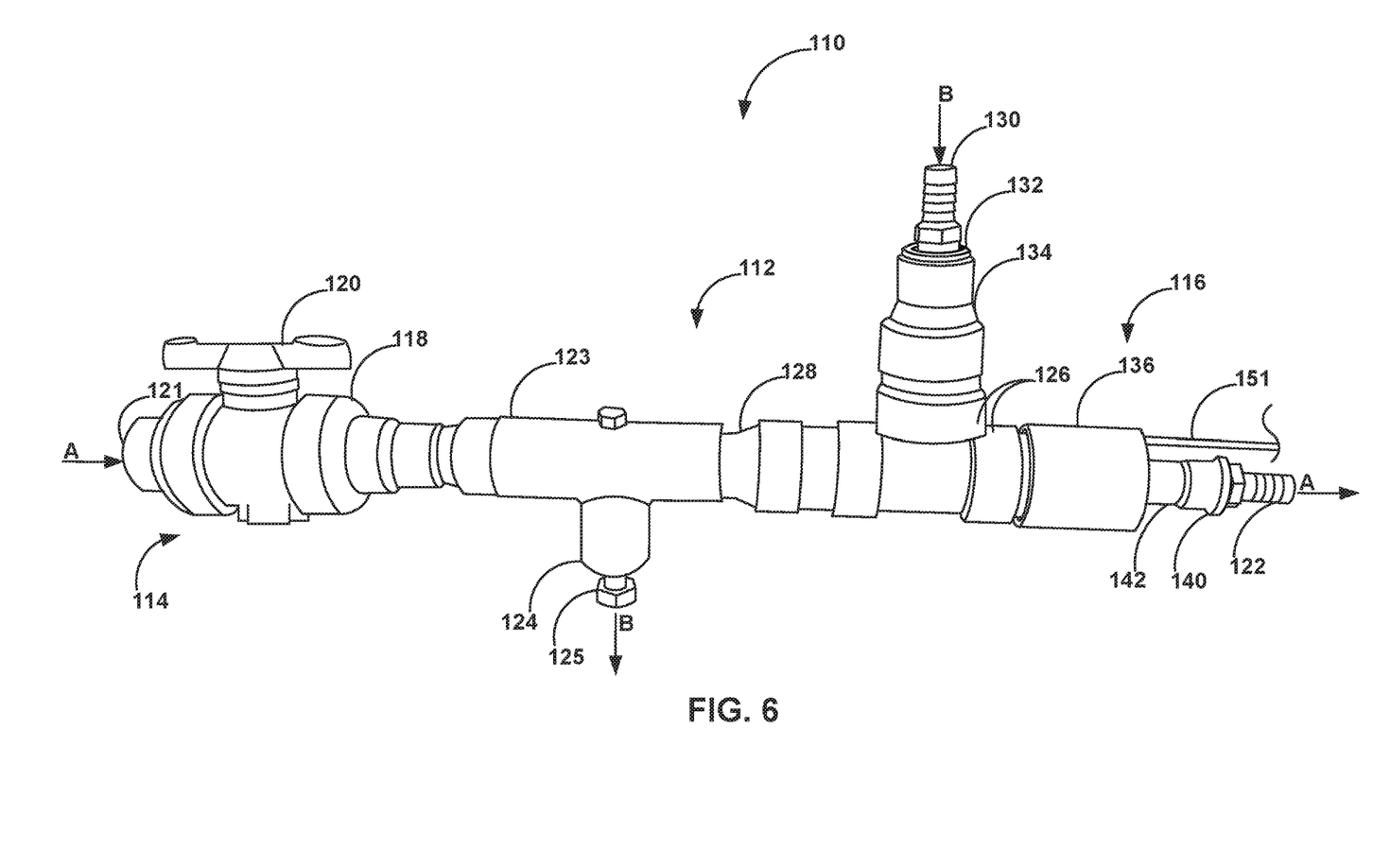
FIG. 6 is a side perspective view of a working prototype of another example side-flushing mechanical filter system in accordance with this disclosure, with paths of water travel during normal operation (A) and during sediment flushing (B) shown.

FIG. 6 is a side perspective view of a working prototype of another example side-flushing mechanical filter system 110 in accordance with this disclosure, with paths of water travel during normal operation (A) and during sediment flushing (B) shown. FIG. 6 shows all functional external features of the prototype system 110. Additional views of the prototype system 110 are presented in U.S. Provisional Application No. 62/982,908, incorporated herein by reference. The components and operation of the system 110 are substantially similar to the system 10 of FIGS. 1-4, with like reference numerals representing like features (e.g., the first valve 20 of system 10 corresponds to the first valve 120 of system 110, etc.). The prototype system 110 differs from the system 10 in that a bolt 125 is provided at the bottom of the pipe 112 instead of the valve 25 at the bottom of the pipe 12. During normal operation of the prototype system 110, the bolt 125 may be tightened to prevent the flow of water therethrough, whereas during sediment-flushing operation the bolt 125 may be loosened or removed to allow water to flow through the second water outlet 124. The prototype system 110 also differs from the system 10 in that a separate sediment outlet is not included. However, additional valves as illustrated and discussed with respect to FIG. 1 may be included in a similar prototype at one or more of the top, bottom, and/or distal regions of the prototype system 110 to control the flow of water through the system 110 during normal filtering operation and/or sediment flushing. Additionally, or alternatively, a sediment release valve may be included in a similar prototype, substantially as illustrated in FIG. 1 and discussed above.

The filter system of the present disclosure may be readily assembled from metalworking materials such as drills and saws, drilling a hole in a PVC pipe for the rod, placing the spring, plates, and rod mechanism within the pipe and attaching gaskets (i.e., rubber water seals, not shown) for the rod.

Figure 7:
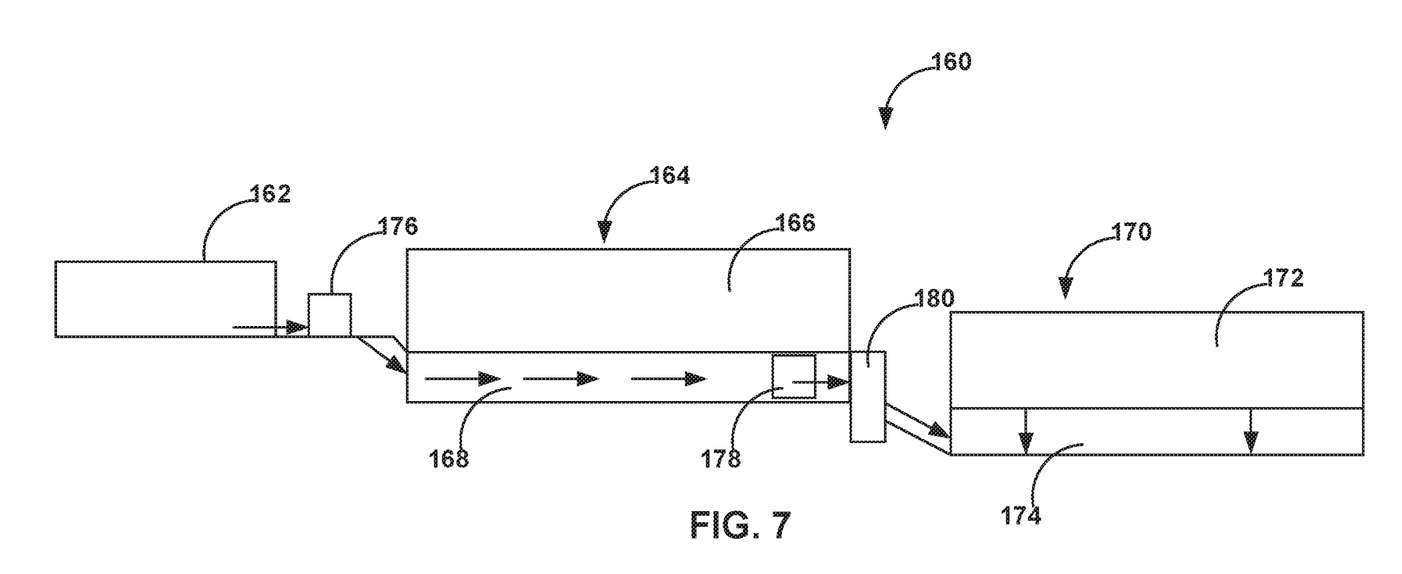
FIG. 7 is a block diagram of an example use of the side-flushing mechanical filter systems of this disclosure in a hybrid wetland system comprising a horizontal-flow wetland and a vertical-flow wetland.
Figure 8:
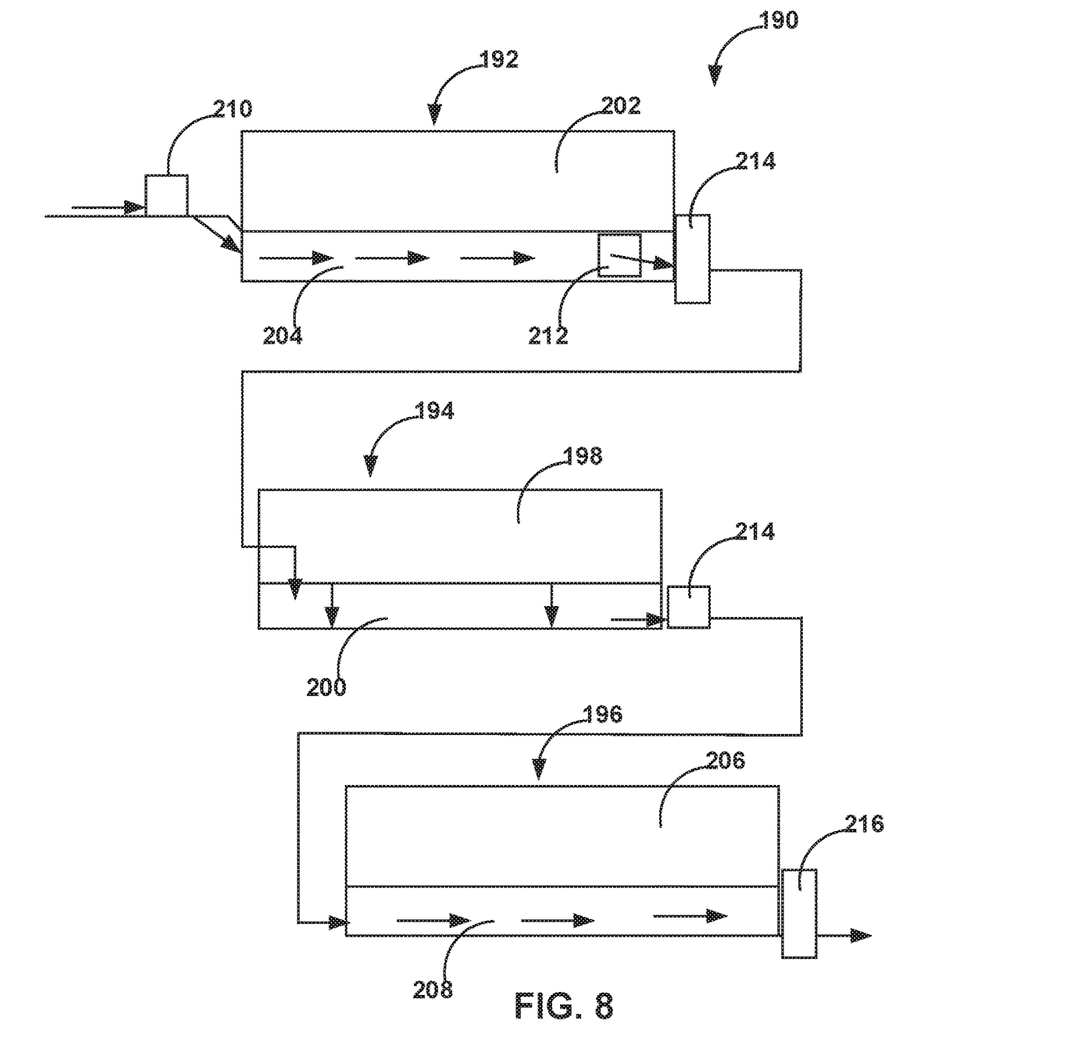
FIG. 8 is a block diagram of an example use of the side-flushing mechanical filter systems of this disclosure in a tiered wetland system comprising a vertical-flow wetland between two horizontal-flow wetlands.
Figure 9:
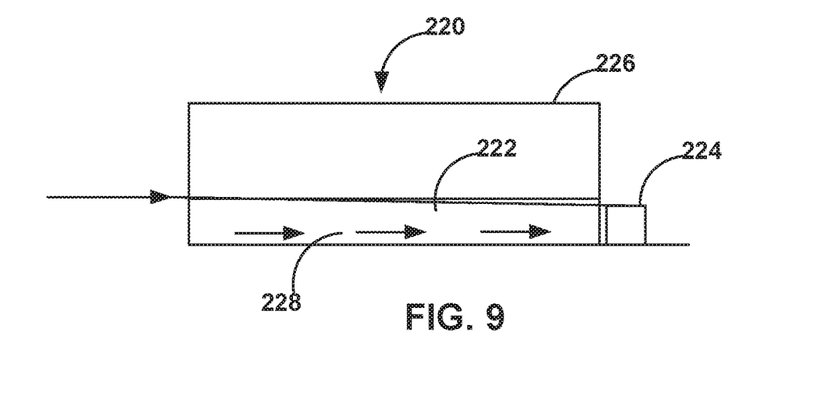
FIG. 9 is a block diagram of an example use of the side-flushing mechanical filter systems of this disclosure in a horizontal-flow wetland with a hose attached to the filter system during sediment flushing.

FIGS. 7-9 illustrate several uses of the side-flushing mechanical filter systems of the present disclosure in various types of wetlands. In all such uses, the filter systems of the present disclosure advantageously are easy to clean in wetland applications, thereby providing lower risk of sediment buildup, running longer and functioning better at wetland maturity than other known filter systems.

FIG. 7 is a block diagram of an example use of the side-flushing mechanical filter systems of this disclosure in a hybrid wetland system 160 comprising a settling basin 162, a horizontal-flow wetland 164 comprising an above-water-filled area 166 and water-filled area 168, and a vertical-flow wetland 170 comprising an above-water-filled area 172 and a water-filled area 174. The path of travel of water throughout the wetland system 160 is depicted by the arrows, from the settling basin 162 to the vertical flow-wetland 170. Wetlands 164 and 170 may contain crops or other plants growing therein. Multiple filter systems according to the present disclosure may be placed in the wetland system 160 to optimize sediment filtering. For example, a first filter system 176 (which may be a filter system according to FIG. 1-5 or 6) may be positioned between the settling basin 162 and the horizontal-flow wetland 164, with the proximal end of the filter system 176 connected to the settling basin 162 with a hose or pipe and the distal end of the filter system 176 connected to the horizontal wetland 164 with a hose or pipe so that filtered water flows into the wetland 164. A second filter system 178, which may be substantially similar to the filter system 176, is positioned in water-filled area 174 of the horizontal-flow wetland 164 so that water flows into the proximal end and out of the distal end of the filter system 178. Filtered water flows into a water control chamber 180 and then into the vertical-flow wetland 170. Sediment accumulating in the filter systems 176 and 178 may be flushed as discussed above.

FIG. 8 is a block diagram of an example use of the side-flushing mechanical filter systems of this disclosure in a tiered wetland system 190. The tiered wetland system 190 comprises a vertical-flow wetland 192 between two horizontal-flow wetlands 194 and 196. The vertical-flow wetland 194 may be similar to the vertical-wetland 170 of FIG. 7, comprising an above-water-filled area 198 and a water-filled area 200, while the horizontal-flow wetlands 192 (comprising an above-water-filled area 202 and a water-filled area 204) and 196 (comprising an above-water-filled area 206 and a water-filled area 208) may be similar to wetland 164 of FIG. 7. As in FIG. 7, a first filter system 210 of the present disclosure may be positioned as discussed above to filter water entering wetland 192 and a second filter system 212 may be positioned in water-filled area 204 of the horizontal-flow wetland 192 so that water flows into the proximal end and out of the distal end of the filter system 212. Filtered water flows into a water control chamber 214 and then into the vertical-flow wetland 194. A third filter system 216 may be positioned between vertical-flow wetland 194 and the second horizontal-flow wetland 196 to filter water exiting the vertical-flow wetland 194 before it enters the second horizontal-flow wetland 196. A second water control chamber 218 may be positioned to control water exiting the second horizontal-flow wetland 196. In this manner, the water flowing through the wetland system 190 is filtered before entering each of wetlands 192, 194, and 196. Sediment accumulating in the filter systems 210, 212, and 214 may be flushed as discussed above.

FIG. 9 is a block diagram of an example use of the side-flushing mechanical filter systems of this disclosure in a horizontal-flow wetland 220 with a hose 222 attached to a filter system 224 during sediment flushing. Horizontal-flow wetland 220 may be similar to the horizontal-flow wetlands described above, comprising an above-water-filled area 226 and a water-filled area 228. The filter system 224 may substantially similar to the filter systems of FIG. 1-5 or 6. Water flowing into the horizontal-flow wetland 220 enters the hose 222, which is connected to an upper water inlet (e.g., second water inlet 30 of filter system 110 or second water inlet 130 of filter system 110), spraying water onto the plates within the filter system 224 to enable sediment flushing from the filter system 224 as described above with respect to filter systems 10 and 110.

The description of the invention and its applications as set forth herein is illustrative and is not intended to limit the scope of the invention. Features of various embodiments may be combined with other embodiments within the contemplation of this invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

What is claimed is:

1. A side-flushing mechanical filter system comprising:
   a main body comprising an elongated section of pipe extending from a proximal end to a distal end;
   a first water inlet at the proximal end of the pipe;
   a first water outlet at the distal end of the pipe;
   a second water inlet positioned at an upper surface of the pipe between the proximal and distal ends of the pipe;
   a second water outlet positioned at a lower surface of the pipe between the proximal and distal ends of the pipe;
   a sediment outlet positioned at the lower surface of the pipe between the proximal and distal ends of the pipe, the sediment outlet distal to the second water outlet;
   an elongated spring positioned within the pipe, the elongated spring comprising a plurality of coils and extending substantially parallel to a longitudinal axis defined by the pipe, wherein a portion of the spring is axially aligned with the second water inlet relative to the longitudinal axis of the pipe;
   a plurality of plates positioned within the pipe, wherein each plate is attached to a different one of the plurality of coils of the spring such that a major face of each plate is substantially perpendicular to the longitudinal axis of the pipe, each plate of the plurality of plates defining at least one hole therethrough; and
   a rod positioned partially within the pipe such that a proximal end of the rod is attached to a distal-most plate of the plurality of plates and a distal portion of the rod extends externally of the pipe from the distal end of the pipe,
   wherein the major face of each plate is configured to arrest sediment from water flowing into the pipe via the first water inlet while the holes defined by the plates enable filtered water to flow therethrough and out of the first water outlet when the first water inlet and the first water outlet are opened.

2. The side-flushing mechanical filter system of claim 1, wherein the rod is configured for back-and-forth longitudinal movement during cleaning of accumulated sediment from the system while graywater flows into the pipe via the second water inlet and over the plates to dislodge sediment from the plates and a bottom of the pipe such that the longitudinal movement of the rod pushes the dislodged sediment toward the sediment outlet while the graywater flows out of the second water outlet.

3. The side-flushing mechanical filter system of claim 2, further comprising:
   a first hose positioned at the second water inlet; and
   a second hose positioned at the first water outlet;
   wherein the first hose is configured to be at least one of pinched closed and plugged during use of the system to filter sediment from water while the second hose is open; and
   wherein the first hose is configured to be open during cleaning of accumulated sediment from the system while the second hose is at least one of pinched closed and plugged.

4. The side-flushing mechanical filter system of claim 2, wherein the spring and plurality of plates are configured to push the dislodged sediment out of the pipe via the sediment outlet during cleaning of the accumulated sediment during the back-and-forth longitudinal movement of the rod when the sediment outlet is open.

5. The side-flushing mechanical filter system of claim 1, further comprising:
   a first valve positioned at the first water inlet;
   a second valve positioned at the second water outlet; and
   a third valve positioned at the sediment outlet;
   wherein the first valve is configured to be open and the second and third valves are configured to be closed when the system is filtering sediment from water; and
   wherein the first valve is configured to be closed and the second and third valves are configured to be open during cleaning of accumulated sediment from the system.

6. The side-flushing mechanical filter system of claim 5, further comprising:
   a fourth valve positioned at the second water inlet; and
   a fifth valve positioned at the first water outlet;
   wherein the fourth valve is configured to be closed and the fifth valve is configured to be open when the system is filtering sediment from water; and
   wherein the fourth valve is configured to be open and the fifth valve is configured to be closed during cleaning of accumulated sediment from the system.

7. The side-flushing mechanical filter system of claim 1, wherein the second water inlet and the second water outlet are axially aligned along the longitudinal axis of the pipe.

8. The side-flushing mechanical filter system of claim 1, wherein the second water inlet is positioned distally to the second water outlet along the longitudinal axis of the pipe.

9. The side-flushing mechanical filter system of claim 1, further comprising a bolt removably received within the second water outlet, wherein the bolt is configured to block water from flowing through the second water outlet during use of the system to filter sediment from water, and wherein the second water outlet is configured to enable graywater flow therethrough when the bolt is removed from the second water outlet during cleaning of sediment from the system.

10. The side-flushing mechanical filter system of claim 1, wherein the plurality of plates are attached to the different coils of the spring such that there is at least one non-plate-bearing coil between each of the plate-bearing coils of the spring.

11. The side-flushing mechanical filter system of claim 1, wherein the plurality of plates each have a substantially circular shape.

12. The side-flushing mechanical filter system of claim 1, wherein a diameter of each of the plurality of coils of the spring and each of the plurality of plates is substantially the same.

13. The side-flushing mechanical filter system of claim 1, wherein a diameter of each of the plurality of plates is greater than a diameter of each of the plurality of coils of the spring.

14. The side-flushing mechanical filter system of claim 1, wherein at least one of the rod and the plurality of plates are formed from stainless steel.

\* \* \* \* \*